(12) United States Patent
Mast

(10) Patent No.: US 7,643,735 B1
(45) Date of Patent: Jan. 5, 2010

(54) DEER SCENT SPREADING APPARATUS AND METHOD

(76) Inventor: Henry M. Mast, W. 5641 Broken Arrow Rd., Sheldon, WI (US) 54766

( * ) Notice: Subject to any disclaimer, the term of this patent is extended or adjusted under 35 U.S.C. 154(b) by 568 days.

(21) Appl. No.: 11/620,252

(22) Filed: Jan. 5, 2007

(51) Int. Cl.
*F24F 6/08* (2006.01)

(52) U.S. Cl. ............... 392/395; 239/145; 222/146.5

(58) Field of Classification Search .................. 392/395
See application file for complete search history.

(56) References Cited

U.S. PATENT DOCUMENTS

| | | | | |
|---|---|---|---|---|
| 2,609,230 | A * | 9/1952 | Raleigh | 239/47 |
| 3,207,441 | A * | 9/1965 | Schreiber | 239/47 |
| 4,163,038 | A * | 7/1979 | Nishimura et al. | 422/36 |
| 4,742,960 | A * | 5/1988 | Bustillo et al. | 239/47 |
| 4,771,563 | A * | 9/1988 | Easley | 43/1 |
| 4,937,431 | A * | 6/1990 | Jameson et al. | 392/395 |
| 5,094,025 | A * | 3/1992 | Daniels | 43/1 |
| 5,161,646 | A | 11/1992 | Aurich et al. | |
| 5,307,584 | A * | 5/1994 | Jarvis | 43/1 |
| 5,429,271 | A * | 7/1995 | Porter | 222/3 |
| 5,622,314 | A * | 4/1997 | Eason | 239/47 |
| 5,744,106 | A * | 4/1998 | Eagle | 422/306 |
| 5,832,648 | A * | 11/1998 | Malone | 43/1 |
| 6,240,248 | B1 | 5/2001 | Fore | |
| 6,241,161 | B1 * | 6/2001 | Corbett | 239/58 |
| D447,533 | S | 9/2001 | Cox | |
| 6,592,104 | B2 * | 7/2003 | Cox | 261/26 |
| 6,610,254 | B1 * | 8/2003 | Furner et al. | 422/123 |
| 6,745,950 | B1 * | 6/2004 | Longo | 239/44 |
| 6,820,363 | B1 * | 11/2004 | Averette, Jr. | 43/1 |
| 6,983,103 | B1 | 1/2006 | Parcher | |
| 7,133,605 | B2 * | 11/2006 | Niemeyer | 392/390 |
| 7,419,102 | B2 * | 9/2008 | Harris, Jr. | 239/48 |
| 2002/0197189 | A1 | 12/2002 | Lua | |

* cited by examiner

*Primary Examiner*—Thor S Campbell

(57) ABSTRACT

A deer scent spreading apparatus includes an inner container positioned in an outer container. A peripheral wall of the inner container is spaced from a peripheral wall of the outer container. A cover is removably attached to the outer container and covers an opening defined by an upper edge of the outer container. A fluid is positioned between the outer and inner containers. A liquid scent configured to attract deer is positioned within the inner container. The fluid is heated to heat the liquid scent. A wicking member is attached to a bottom side of the cover and is positioned to be extended into the inner container. A tether is attached to the cover and extends upwardly away from a top side of the cover. The wicking member is at least partially removed from the inner container to disperse by evaporation the liquid scent absorbed therein.

9 Claims, 4 Drawing Sheets

DEER SCENT SPREADING APPARATUS AND METHOD

BACKGROUND OF THE INVENTION

1. Field of the Invention

The present invention relates to deer scent spreading devices and more particularly pertains to a new deer scent spreading device for dispersing scent for attracting game, and in particular for attracting deer.

2. Description of the Prior Art

The use of deer scent spreading devices is known in the prior art. While these devices fulfill their respective, particular objectives and requirements, the need remains for a device that heats the scent being used to attract game to insure more evaporation and thereby more dispersal of the scent. This is particularly effective for deer hunting which is often done in cold weather which decreases the effectiveness of the scent.

SUMMARY OF THE INVENTION

The present invention meets the needs presented above by generally comprising an outer container and an inner container. Each of the outer and inner containers has a bottom wall and a peripheral wall that is attached to and extends upwardly from the bottom wall. The peripheral walls each have an upper edge defining an opening extending into an associated one of the outer and inner containers. The inner container is positioned within the outer container. The bottom wall of the inner container abuts the bottom wall of the inner container. The peripheral wall of the inner container is spaced from the peripheral wall of the outer container. A cover is removably attached to the outer container and covers the opening defined by the upper edge of the outer container. A fluid positioned in the outer container and is positioned between the peripheral walls of the outer and inner containers. A liquid scent configured to attract deer is positioned within the inner container. The fluid is heated to heat the liquid scent. A wicking member is attached to a bottom side of the cover. The wicking member is positioned to be extended into the inner container when the cover covers the outer container. A tether is attached to the cover and extends upwardly away from a top side of the cover. The wicking member is at least partially removed from the inner container to disperse by evaporation the liquid scent absorbed therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view taken along line 3-3 of FIG. 1 of the present invention.

DESCRIPTION OF THE PREFERRED EMBODIMENT

Figure 1:
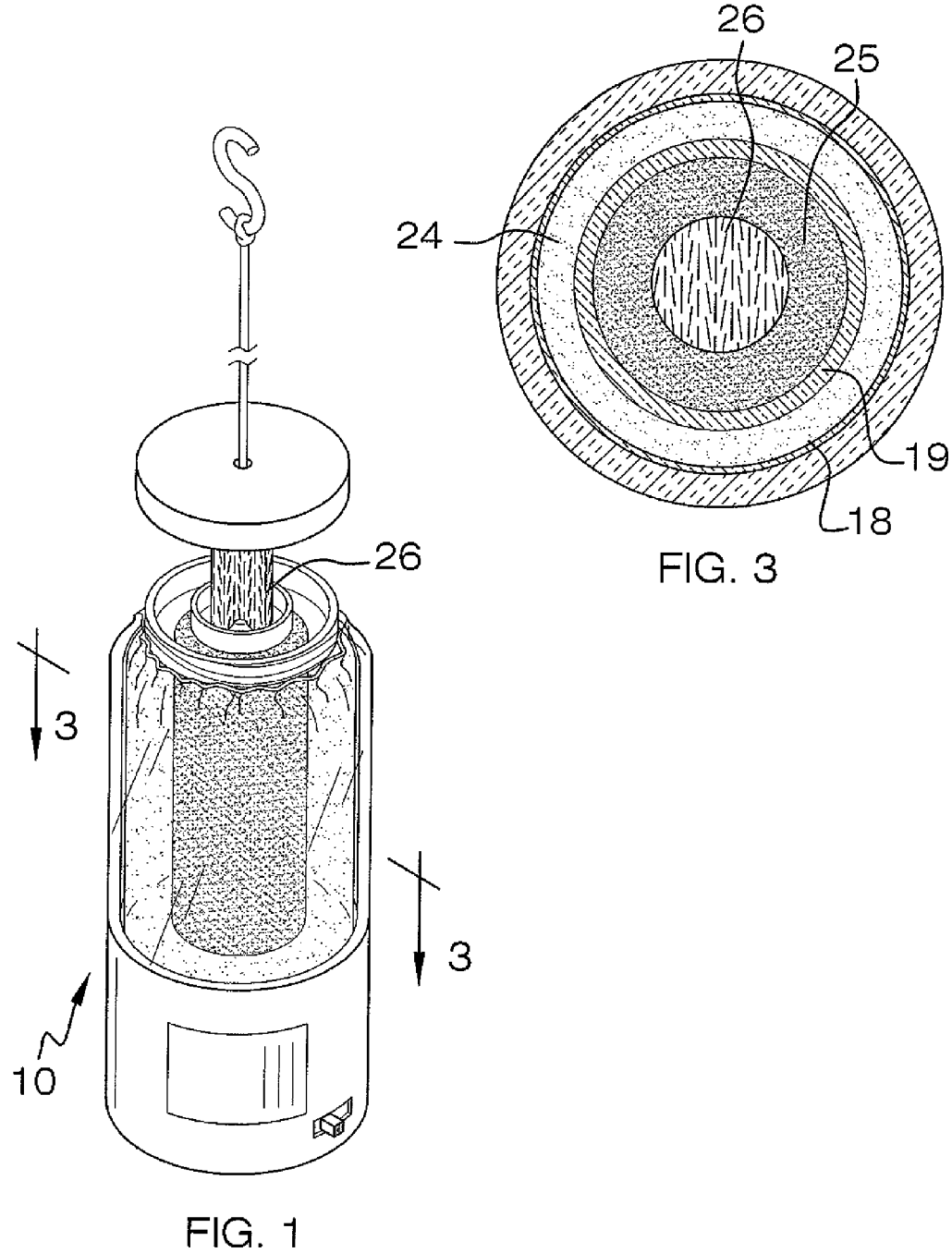
FIG. 1 is a perspective view of a deer scent spreading apparatus and method according to the present invention.
Figure 2:
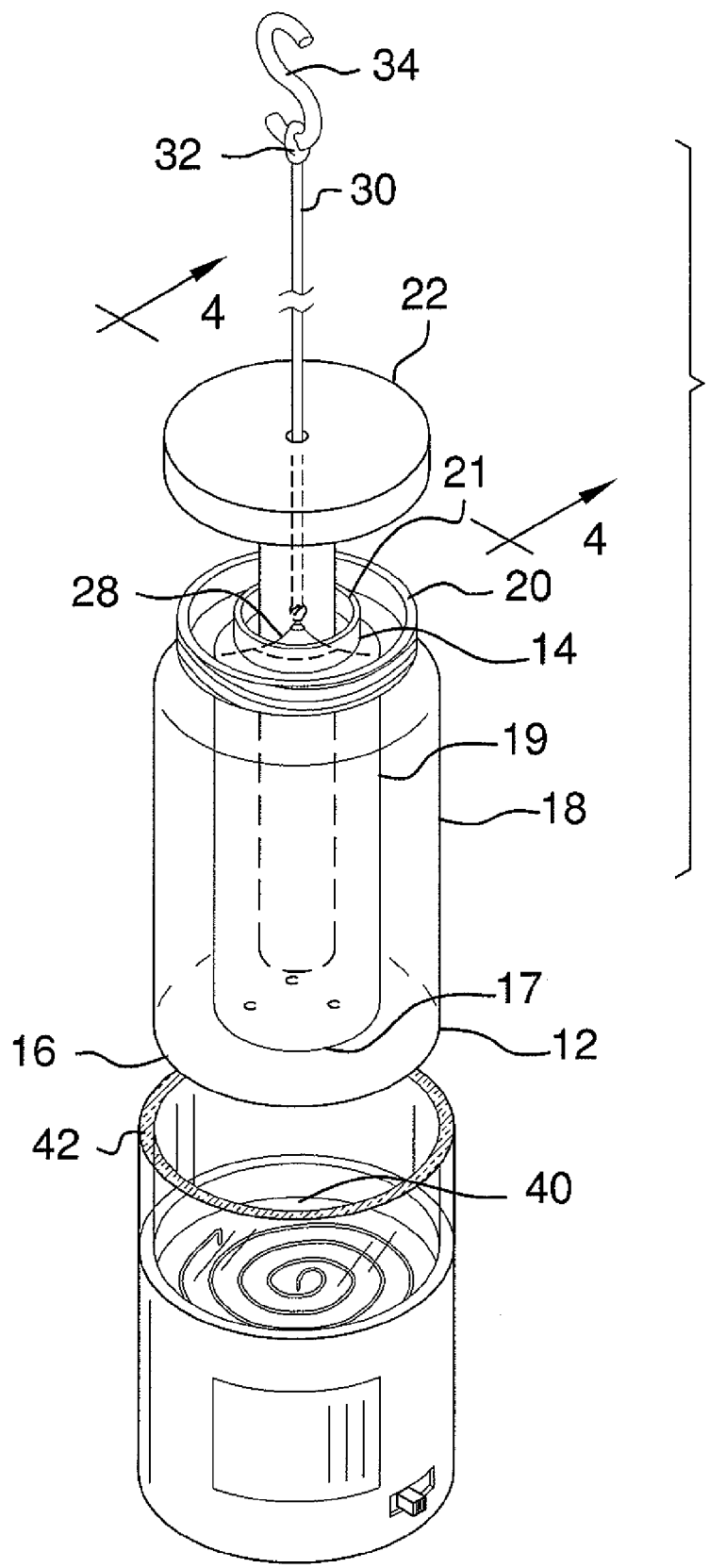
FIG. 2 is an expanded broken view of the present invention.

With reference now to the drawings, and in particular to FIGS. 1 through 6 thereof, a new deer scent spreading device embodying the principles and concepts of the present invention and generally designated by the reference numeral 10 will be described.

As best illustrated in FIGS. 1 through 6, the deer scent spreading apparatus and method 10 generally comprises an outer container 12 and an inner container 14. Each of the outer 12 and inner 14 containers has a bottom wall 16, 17 and a peripheral wall 18,19, respectively, that is attached to and extends upwardly from the bottom wall 16, 17. Each of the peripheral walls 18, 19 has an upper edge 20, 21 defining an opening extending into an associated one of the outer 12 and inner 14 containers. The inner 14 container is positioned within the outer container 12. The bottom wall 17 of the inner container 14 abuts and is attached to the bottom wall 16 of the outer container 17. The peripheral wall 19 of the inner container 14 is spaced from the peripheral wall 18 of the outer container 12. The upper edges 20, 21 are approximately flush with each other. An outer surface of the outer container 12 adjacent to the upper edge 20 thereof is threaded. A cover 22 is removably attached to the outer container 14 and covers an opening defined by the upper edge 20 of the outer container 12. The cover 22 is threadably coupled to the outer container 12. Since the upper edges 20, 21 are flush with each other, the cover 22 effectively closes both the inner 14 and the outer 12 containers.

Figure 4:
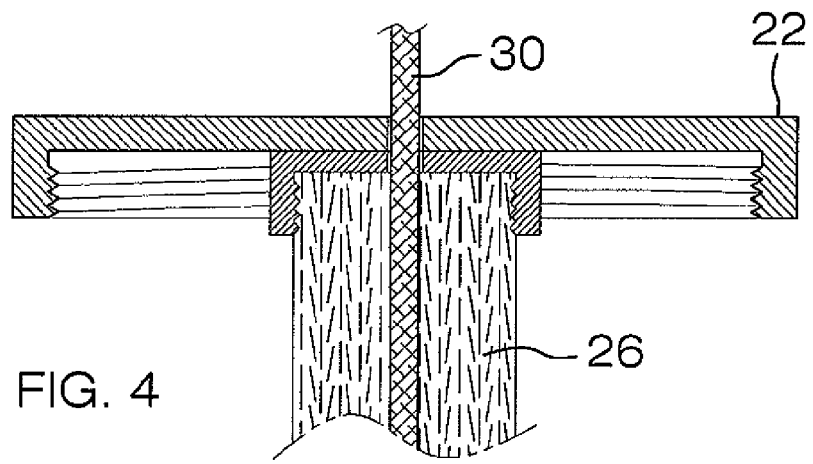
FIG. 4 is a cross-sectional view taken alone line 4-4 of FIG. 2 of the present invention.
Figure 5:
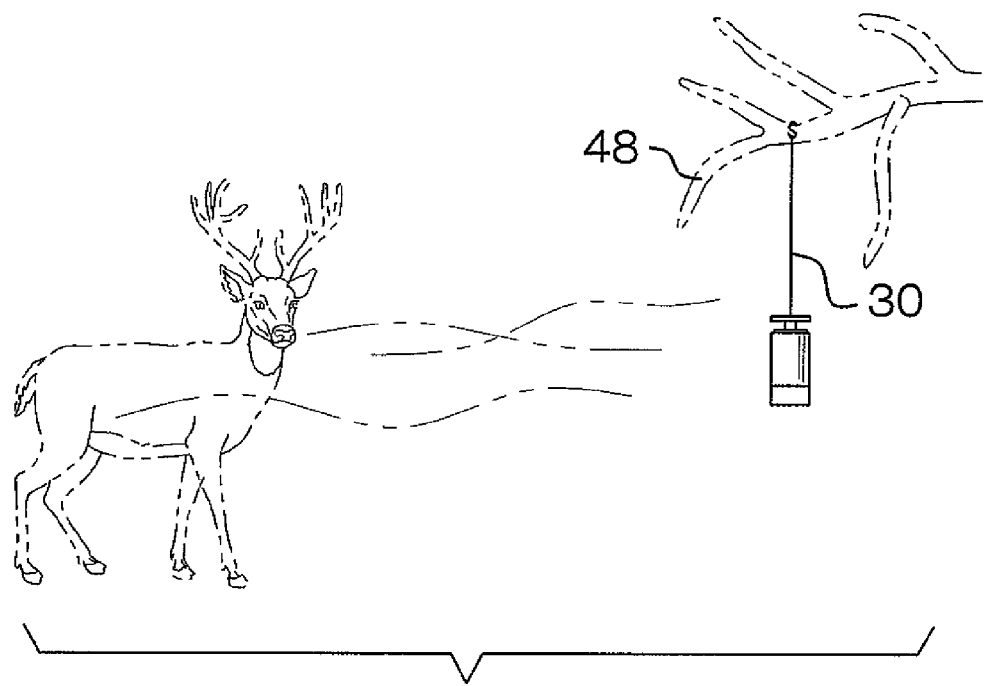
FIG. 5 is a side in-use view of the present invention.
Figure 7:
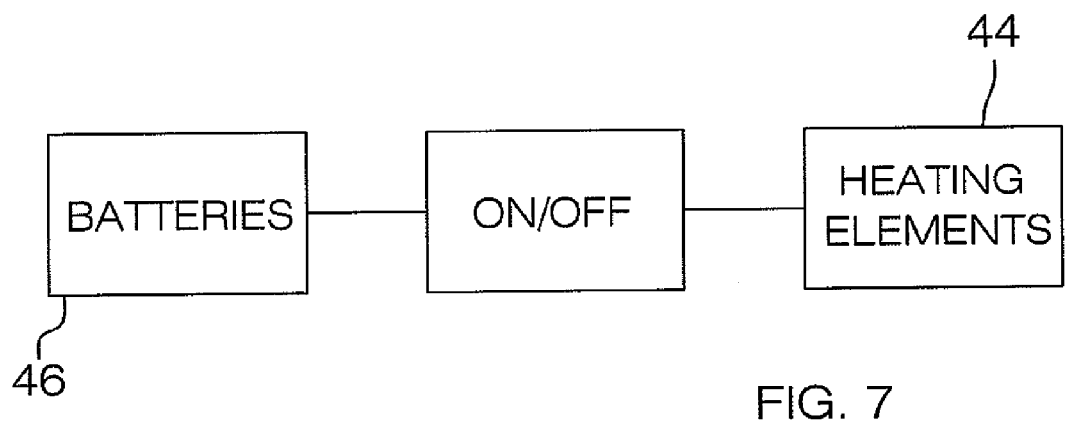
FIG. 7 is a schematic view of a heating assembly of the present invention.
Figure 6:
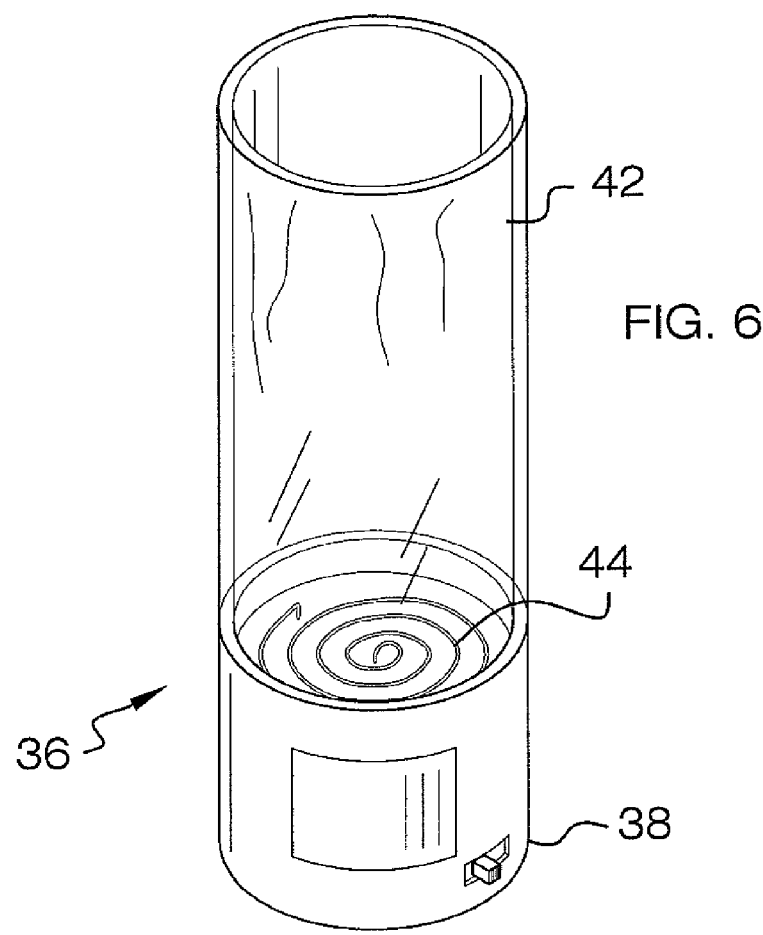
FIG. 6 is a perspective view of a heating assembly of the present invention.

A fluid 24 positioned in the outer container 12 and is positioned between the peripheral walls 18, 19 of the outer 12 and inner 14 containers. The fluid 24 may consist of water. A liquid scent 25 configured to attract deer is positioned within the inner container 14. A wicking member 26 of absorbent material is attached to a bottom side of the cover 22 and is positioned to be extended into the inner container 14 when the cover 22 closes the outer container 12. A stop 28 is attached to the wicking member 26 and engages the inner container 14 to allow the wicking member 26 to be only partially removed from the inner container 14. The stop 28 may include an inverted V-shaped bracket positioned within the inner container 14. A tether 30 is attached to the cover 22. The tether 30 extends upwardly away from a top side of the cover 22 and has a distal end 32 with respect to the cover 22. A hook 34 is attached to the distal end 32. As shown in FIG. 4, the tether 30 may extend through the cover 22 and be attached to the wicking member 26.

A heating assembly 36 is configured to heat the outer container 12. The heating assembly 36 includes a base 38 that has a top side 40 and a perimeter wall 42 that is attached to the base 38 and extends upwardly from the top side 40. The perimeter wall 42 has a size configured to receive the outer container 14. Heating elements 44 are mounted in the base 38 adjacent to the top side 40. The heating elements 44 emit heat when turned on. The heating assembly 36 may be portable and be powered by batteries 46 stored within the base 38 since the liquid 24 is only to be heated, not boiled and disposable or rechargeable batteries will be able to supply enough electricity to achieve this goal. FIG. 1 shows a perimeter wall 42 that may be flexible to better envelope the outer container 12.

In use, the outer container 12 is positioned into the heating assembly 36 to heat the outer container 12 which in turn heats the fluid 24. The warmed fluid 24 warms the liquid scent 25 without danger of overheating the scent 25 which typically has a low boiling point. The outer container 12 is then removed from the heating assembly 36, the cover 22 removed and the wick 26 partially removed from the inner container 14. The tether 30 is attached to a support 48 to support the outer 12 and inner 14 containers above a ground surface with the wick 26 extending outwardly of the inner container 14. Because the scent 25 has been heated, it will evaporate more quickly and have increased intensity. The perimeter wall 42 of the heating assembly 36 is preferably comprised of a heat insulating material to retain the fluid 24 in a warm state for a period of time after the heat assembly 36 has been turned off or has run out of power.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A deer scent releasing apparatus comprising:
   an outer container and an inner container, each of said outer and inner containers having a bottom wall and a peripheral wall being attached to and extending upwardly from said bottom wall, each of said peripheral walls having an upper edge defining an opening extending into an associated one of said outer and inner containers, said inner container being positioned within said outer container, said bottom wall of said inner container abutting said bottom wall of said outer container, said peripheral wall of said inner container being spaced from said peripheral wall of said outer container;
   a cover being removably attached to said outer container and covering the opening defined by said upper edge of said outer container;
   a fluid positioned in said outer container and being positioned between said peripheral walls of said outer and inner containers;
   a liquid scent configured to attract deer being positioned within said inner container, wherein the fluid is heated to heat the liquid scent;
   a wicking member being attached to a bottom side of said cover, said wicking member being positioned to be extended into said inner container when said cover covers said outer container;
   a tether being attached to said cover, said tether extending upwardly away from a top side of said cover; and
   wherein said wicking member is at least partially removed from said inner container to disperse by evaporation the liquid scent absorbed therein.

2. The apparatus according to claim 1, wherein said upper edges of said outer and inner containers are approximately flush with each other.

3. The apparatus according to claim 1, wherein an outer surface of said outer container adjacent to the upper edge thereof is threaded, said cover being threadably coupled to said outer container.

4. The apparatus according to claim 1, further including a stop being attached to said wicking member and engaging said inner container to allow said wicking member only partial removal from said inner container.

5. The apparatus according to claim 4, wherein said tether having a distal end with respect to said cover, a hook being attached to said distal end.

6. The apparatus according to claim 1, wherein said tether having a distal end with respect to said cover, a hook being attached to said distal end.

7. The apparatus according to claim 1, further including a heating assembly being configured to heat said outer container, said heating assembly including a base having a top side, a perimeter wall being attached to said base and extending upwardly from said top side, said perimeter wall having a size configured to receive said outer container, heating elements being mounted in said base adjacent to said top side, wherein said heating elements emit heat when said heating elements are turned on.

8. A deer scent releasing apparatus comprising:
   an outer container and an inner container, each of said outer and inner containers having a bottom wall and a peripheral wall being attached to and extending upwardly from said bottom wall, each of said peripheral walls having an upper edge defining an opening extending into an associated one of said outer and inner containers, said inner container being positioned within said outer container, said bottom wall of said inner container abutting and being attached to said bottom wall of said outer container, said peripheral wall of said inner container being spaced from said peripheral wall of said outer container, said upper edges being approximately flush with each other, an outer surface of said outer container adjacent to the upper edge thereof being threaded;
   a cover being removably attached to said outer container and covering the opening defined by said upper edge of said outer container, said cover being threadably coupled to said outer container;
   a fluid positioned in said outer container and being positioned between said peripheral walls of said outer and inner containers, said fluid consisting of water;
   a liquid scent configured to attract deer being positioned within said inner container, wherein the fluid is heated to heat the liquid scent;
   a wicking member being attached to a bottom side of said cover, said wicking member being positioned to be extended into said inner container when said cover covers said outer container;
   a stop being attached to said wicking member and engaging said inner container to allow said wicking member only partial removal from said inner container;
   a tether being attached to said cover, said tether extending upwardly away from a top side of said cover, said tether having a distal end with respect to said cover, a hook being attached to said distal end;
   a heating assembly being configured to heat said outer container, said heating assembly including a base having a top side, a perimeter wall being attached to said base and extending upwardly from said top side, said perimeter wall having a size configured to receive said outer container, heating elements being mounted in said base adjacent to said top side, wherein said heating elements emit heat when said heating elements are turned on; and wherein said wicking member is partially removed from said inner container to disperse by evaporation the liquid scent absorbed therein.

9. A method of spreading deer scent including the steps of:

providing an outer container and an inner container, each of said outer and inner containers having a bottom wall and a peripheral wall being attached to and extending upwardly from said bottom wall, each of said peripheral walls having an upper edge defining an opening extending into an associated one of said outer and inner containers, said inner container being positioned within said outer container, said bottom wall of said inner container abutting and being attached to said bottom wall of said outer container, said peripheral wall of said inner container being spaced from said peripheral wall of said outer container, said upper edges being approximately flush with each other, an outer surface of said outer container adjacent to the upper edge thereof being threaded;

providing a cover being removably attached to said outer container and covering the opening defined by said upper edge of said outer container, said cover being threadably coupled to said outer container;

providing a fluid positioned in said outer container and being positioned between said peripheral walls of said outer and inner containers, said fluid consisting of water;

providing a liquid scent configured to attract deer being positioned within said inner container;

providing a wicking member being attached to a bottom side of said cover, said wicking member being positioned to be extended into said inner container when said cover covers said outer container;

providing a stop being attached to said wicking member and engaging said inner container to allow said wicking member only partial removal from said inner container;

providing a tether being attached to said cover, said tether extending upwardly away from a top side of said cover, said tether having a distal end with respect to said cover, a hook being attached to said distal end;

providing a heating assembly being configured to heat said outer container, said heating assembly including a base having a top side, a perimeter wall being attached to said base and extending upwardly from said top side, said perimeter wall having a size configured to receive said outer container, heating elements being mounted in said base adjacent to said top side, wherein said heating elements emit heat when said heating elements are turned on;

positioning said outer container into said heating assembly and heating said outer container to heat said fluid, wherein said fluid warms said scent;

removing the outer container from the heating assembly;

removing the cover and partially removing the wick from the inner container;

attaching said tether to a support to support said outer and inner containers above a ground surface with said wick extending outwardly of said inner container.

\* \* \* \* \*